(12) United States Patent
Lee

(10) Patent No.: US 7,806,581 B2
(45) Date of Patent: Oct. 5, 2010

(54) LIGHTING LAMP

(75) Inventor: Cheng Sheng Lee, Lujhou (TW)

(73) Assignee: Kun Dian Photoelectric Enterprise Co., Lujhou, Taipei County (TW)

( * ) Notice: Subject to any disclaimer, the term of this patent is extended or adjusted under 35 U.S.C. 154(b) by 0 days.

(21) Appl. No.: 12/000,194

(22) Filed: Dec. 10, 2007

(65) Prior Publication Data

US 2010/0214771 A1    Aug. 26, 2010

(51) Int. Cl.
*F21V 7/04* (2006.01)
(52) U.S. Cl. .................................. 362/612; 362/147
(58) Field of Classification Search .................. 362/612, 362/613, 620, 626, 127, 147
See application file for complete search history.

(56) References Cited

U.S. PATENT DOCUMENTS

2005/0180167 A1 *    8/2005   Hoelen et al. ............... 362/613

2009/0086507 A1 *    4/2009   Iwasaki ...................... 362/613

* cited by examiner

*Primary Examiner*—David V Bruce
(74) *Attorney, Agent, or Firm*—Jackson IPG PLLC; Demian K. Jackson

(57) ABSTRACT

A lighting lamp includes a light guide board, which is directly mounted in the cavity of a lamp holder, furniture, utensil, or the construction of a building, having a clear transmissive layer at the front side and a continuous piece of reflective layer a clear transmission layer at the front side and a reflective layer at the back side that has the shape of an umbrella surface and sloping from the periphery toward its center, and a plurality of LEDs mounted within the cavity outside the light guide board and controlled to emit light laterally into the inside of the light guide boards to provide a uniform lighting effect having an enhanced brightness without multi-image and to simulate the lighting effect of a ball lamp.

12 Claims, 9 Drawing Sheets

LIGHTING LAMP

BACKGROUND OF THE INVENTION

1. Field of the Invention

The present invention relates to lighting fixtures and more specifically, to a lighting lamp, which uses a polygonal light guide board with an umbrella surface-like reflective layer to guide light from LEDs so as to provide a uniform lighting effect having an enhanced brightness without multi-image and flashing and to simulate the lighting effect of a ball lamp.

2. Description of the Related Art

LEDs (light emitting diodes) have been intensively used in lighting fixtures to substitute for conventional lamp bulbs and tubes for the advantages of small size, quick reaction time, low attenuation, hard surface structure, shock resistance, full-color emission (including invisible light), directional design applicability, low voltage, low current, low conversion loss, low radiation heat, easy mass production, and environmental protection. Following fast growth of market demand, blue, new fabrication techniques for white and high brightness LEDs have been continuously developed.

Many experts in different countries issued reports that declare the possibility of the application of LED techniques for regular illumination. Using LEDs to replace conventional lamp bulbs and lamp tubes for home use can save the power capacity of one nuclear plant in a country. Every country around the world invests manpower and capital to promote the development of LED technology. It has become an internal competition in development of LED technology.

However, LEDs may be too dim in bright light situations because of its unidirectional lighting feature. Therefore, a LED lighting fixture has the drawback of limited angle of illumination. To overcome this problem, multiple LEDs may be arranged together and set in different angles. However, this arrangement greatly complicates the fabrication of the lighting fixture and will also increase the cost. Further, a lighting fixture constructed according to this arrangement may produce multiple images, not practical to substitute for conventional daylight lamps.

Taiwan Patent Publication No. M306666 discloses a light guide structure for lighting lamp, which is an invention of the present inventor. According to this design, the light guide structure comprises a light guide board made of a transmissive material having a clear transmissive layer, and a reflective layer covered on the back side of the light guide board. The reflective layer has an arched convex portion on the middle (see claim 7). The light guide structure is used with a lateral light source to construct a lighting lamp that increases the angle of illumination, provides a uniform lighting effect with enhanced brightness, and eliminates the multi-image and flashing problems of conventional daylight lamps.

Taiwan Patent Publication No. M317546 discloses an improved structure of lighting fixture, which is an invention of the present inventor. According to this design, the lighting fixture comprises a lamp case, a plurality of LEDs mounted in the lamp case and adapted to emit light toward the center of the lamp case, a see-through window at the bottom side of the lamp case, a reflective board mounted inside the lamp case corresponding to the see-through window. The reflective board has a double-beveled edge at each end. When the LEDs are emitting light, light rays are well dispersed subject to the effect of the reflective board, providing stable illumination and eliminating the problem of multiple-image.

However, the aforesaid two prior art designs are functional, however they are simply suitable for bar illumination, not practical for use as a circular ceiling lamp or ball lamp.

SUMMARY OF THE INVENTION

The present invention has been accomplished under the circumstances in view. It is the main object of the present invention to provide a lighting lamp, which uses a polygonal light guide board with an umbrella surface-like reflective layer to match with LEDs, thereby providing a uniform lighting effect having an enhanced brightness without multi-image and simulating the lighting effect of ball lamp.

To achieve this and other objects of the present invention, the lighting lamp comprises a cavity that can be directly formed in a lamp holder, a piece of furniture, a utensil or the construction of a building, a light guide board mounted inside the cavity, and a set of LEDs. The light guide board is a polygonal board made of a high transmissive material, comprising a clear transmission layer at the front side and a reflective layer at the back side. The reflective layer has the shape of an umbrella surface, and slopes from the periphery toward the center thereof. The LEDs are mounted within the cavity outside the light guide board and adapted to emit light laterally into the inside of the light guide board to provide a uniform lighting effect having an enhanced brightness without causing multi-image and to simulate the lighting effect of a ball lamp.

DETAILED DESCRIPTION OF THE PREFERRED EMBODIMENT

Figure 1:
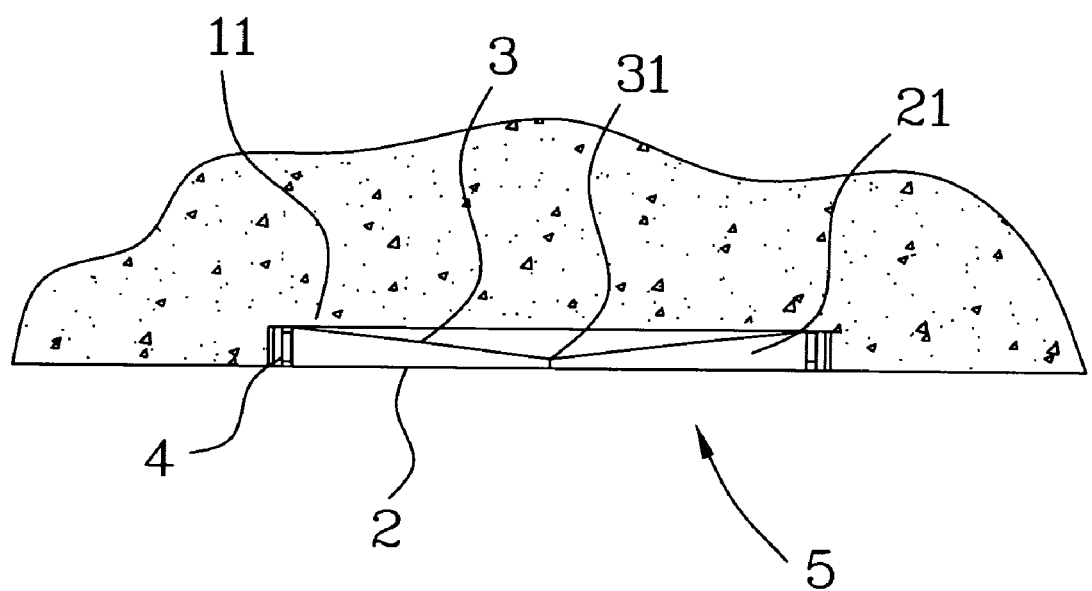
FIG. 1 is a schematic sectional plain view of a lighting fixture in accordance with the present invention.

Referring to FIGS. 1~6, a lighting lamp 5 in accordance with a first embodiment of the present invention is shown comprising a cavity 11, a light guide board 2, and a set of LEDs (light emitting diodes) 4.

The cavity 11 may be directly formed in a lamp holder 1, a piece of furniture, a utensil, or the construction of a building.

The light guide board 2 is a polygonal member made of a high transmissive material and mounted inside the cavity 11, having a clear transmissive layer 21 at the front side and a continuous piece of reflective layer 3 at the back side. The reflective layer 3 has the shape of an umbrella surface, i.e., the surface of the reflective layer 3 slopes from the periphery toward the center 31.

In an example of the present invention, the light guide board 2 is a hexagonal member having an umbrella surface-like back surface 22 curved inwards at the back side, and the reflective layer 3 is directly covered on the umbrella surface-like back surface 22. The umbrella surface-like back surface 22 is divided into 6 equal smoothly curved triangularly shaped panels 23. The smoothly curved triangularly shaped panels 23 curves outwards and slopes downwardly toward the center 31 of the reflective layer 3. The inwardly curved back side design of the light guide board 2 diminishes material consumption.

The LEDs 4 are mounted within the cavity 11 outside the light guide board 2, and adapted to emit light through the light guide board 2 laterally.

Figure 2:
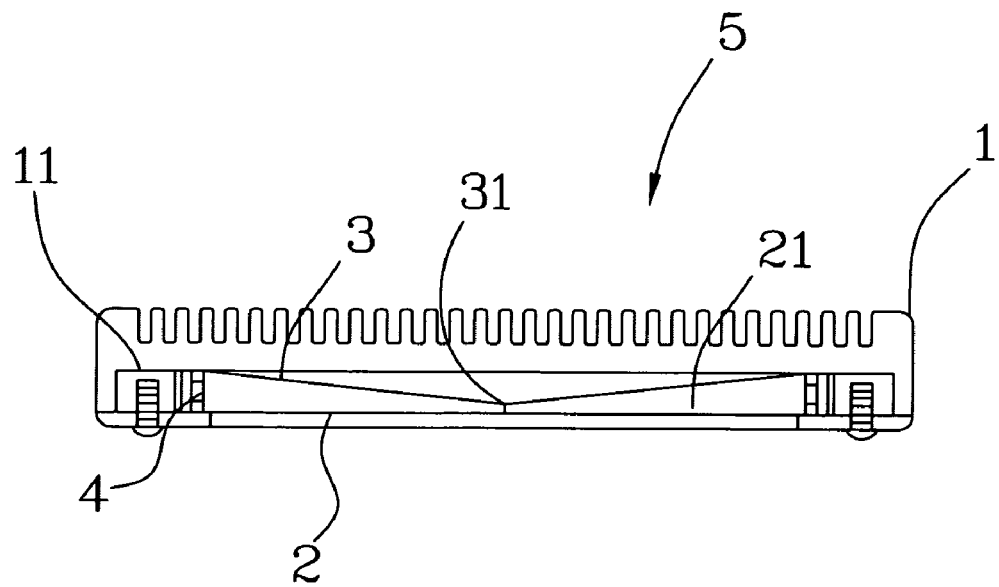
FIG. 2 is a schematic sectional side plain view of the present invention, showing the lighting lamp installed in the cavity of a lamp holder.
Figure 3:
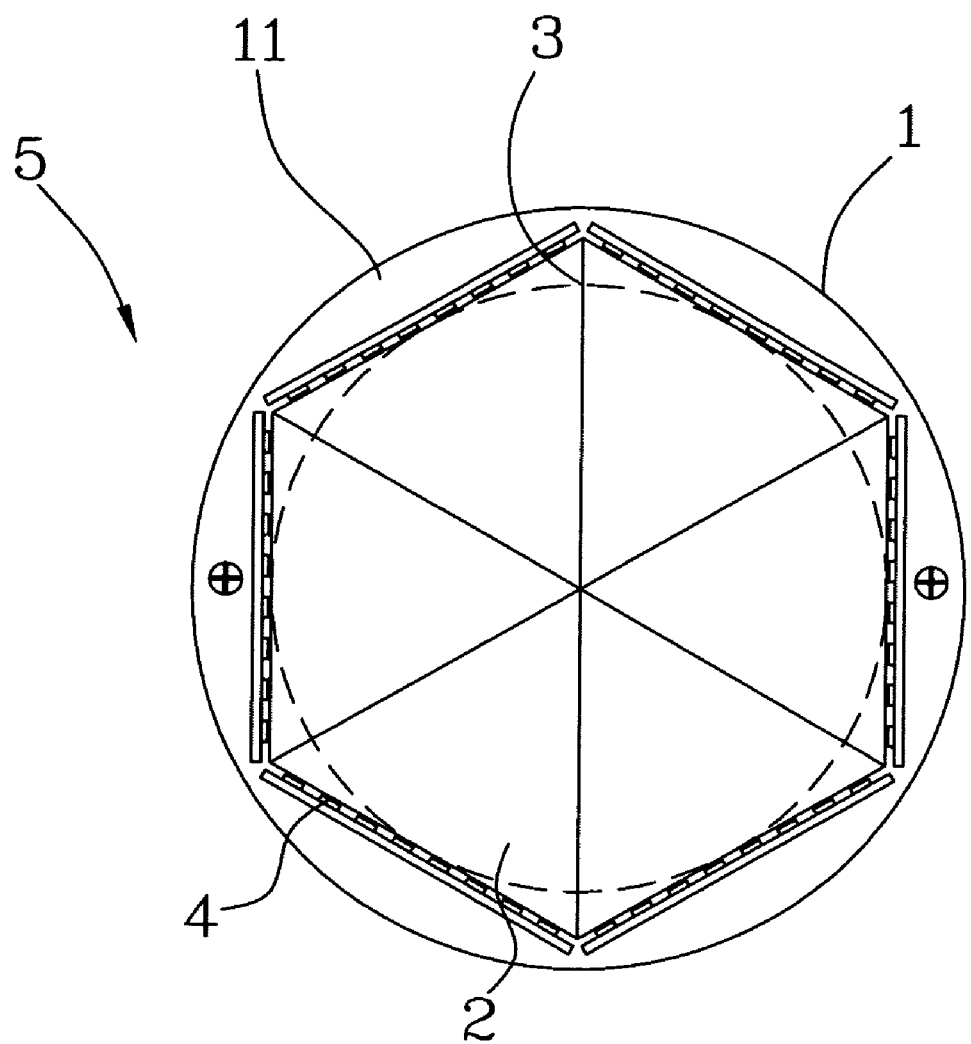
FIG. 3 is a schematic top plain view of the present invention, showing the lighting lamp installed in the cavity of the lamp holder.
Figure 4:
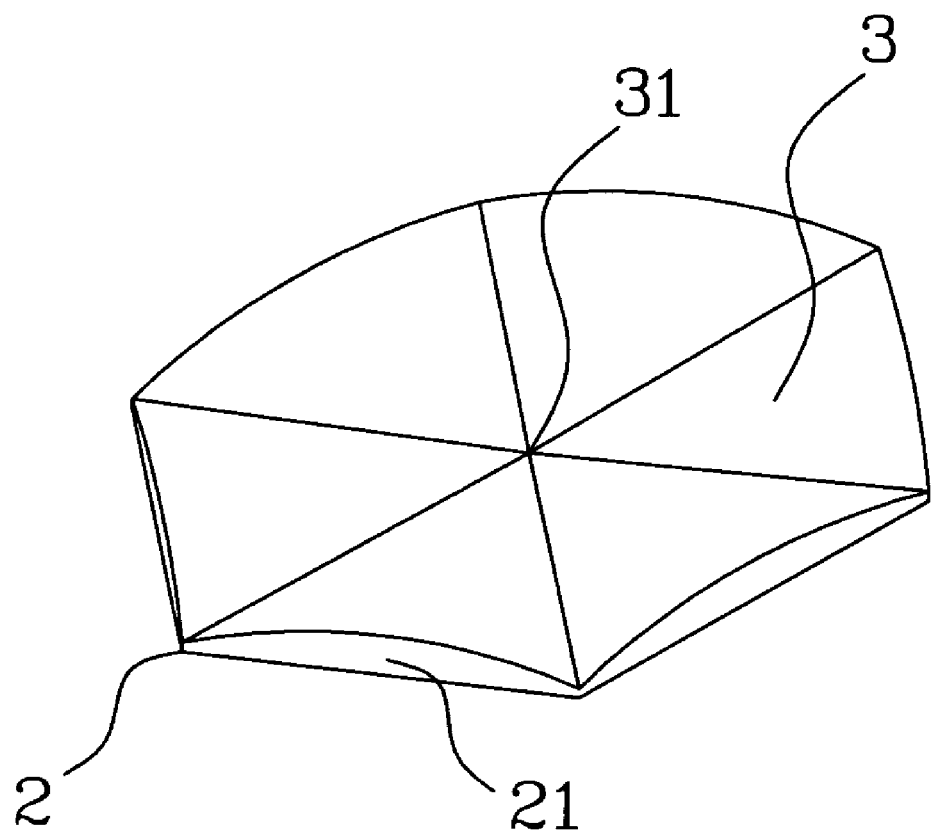
FIG. 4 is a perspective view of the light guide board of the lighting lamp in accordance with the present invention.
Figure 5:
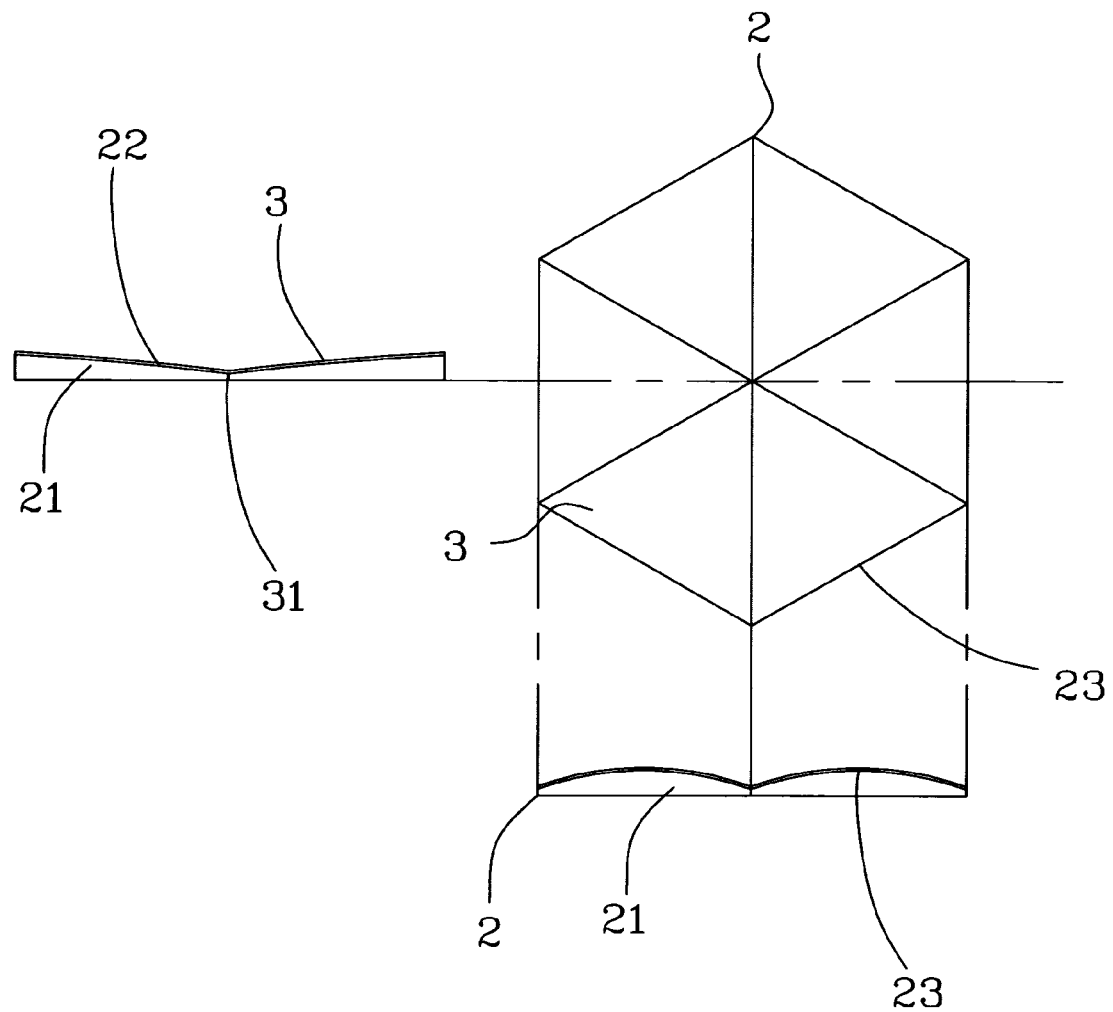
FIG. 5 is a schematic plain view showing the structure of the light guide board of the lighting lamp in accordance with the present invention.
Figure 6:
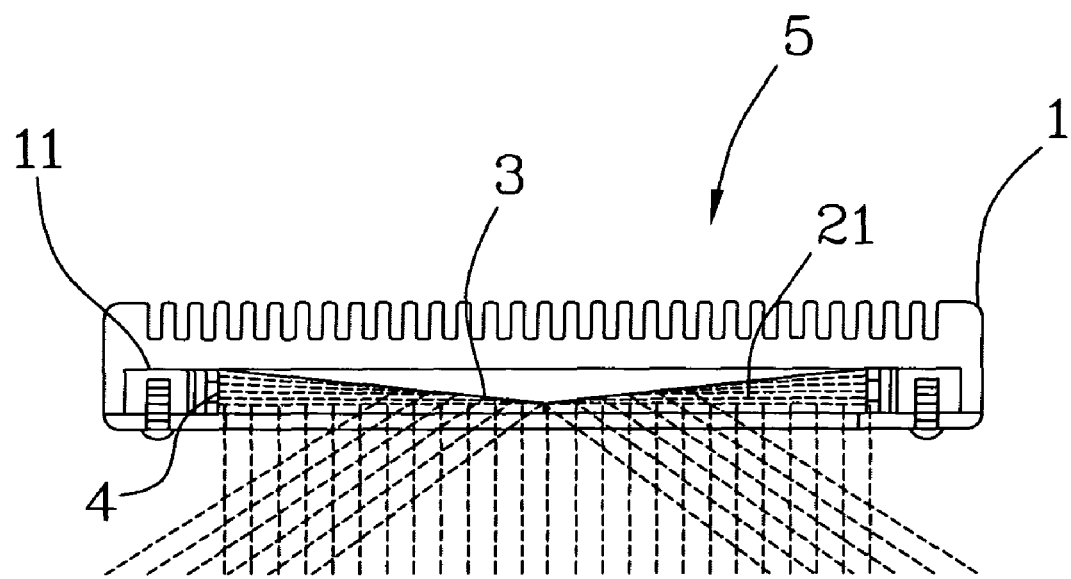
FIG. 6 is a schematic drawing showing an operation status of the lighting lamp in accordance with the present invention.

As shown in FIGS. 1, 2 and 6, after installation of the lighting lamp 5, the LEDs 4 are turned on to emit light toward the inside of the light guide board 2 from two opposite lateral sides. When light rays go through the light guide board 2, the reflective layer 3 reflects light rays from the LEDs 4 toward the center of the light guide board 2, eliminating multi-image, enhancing the brightness, and simulating the lighting effect of a ball lamp.

Figure 7:
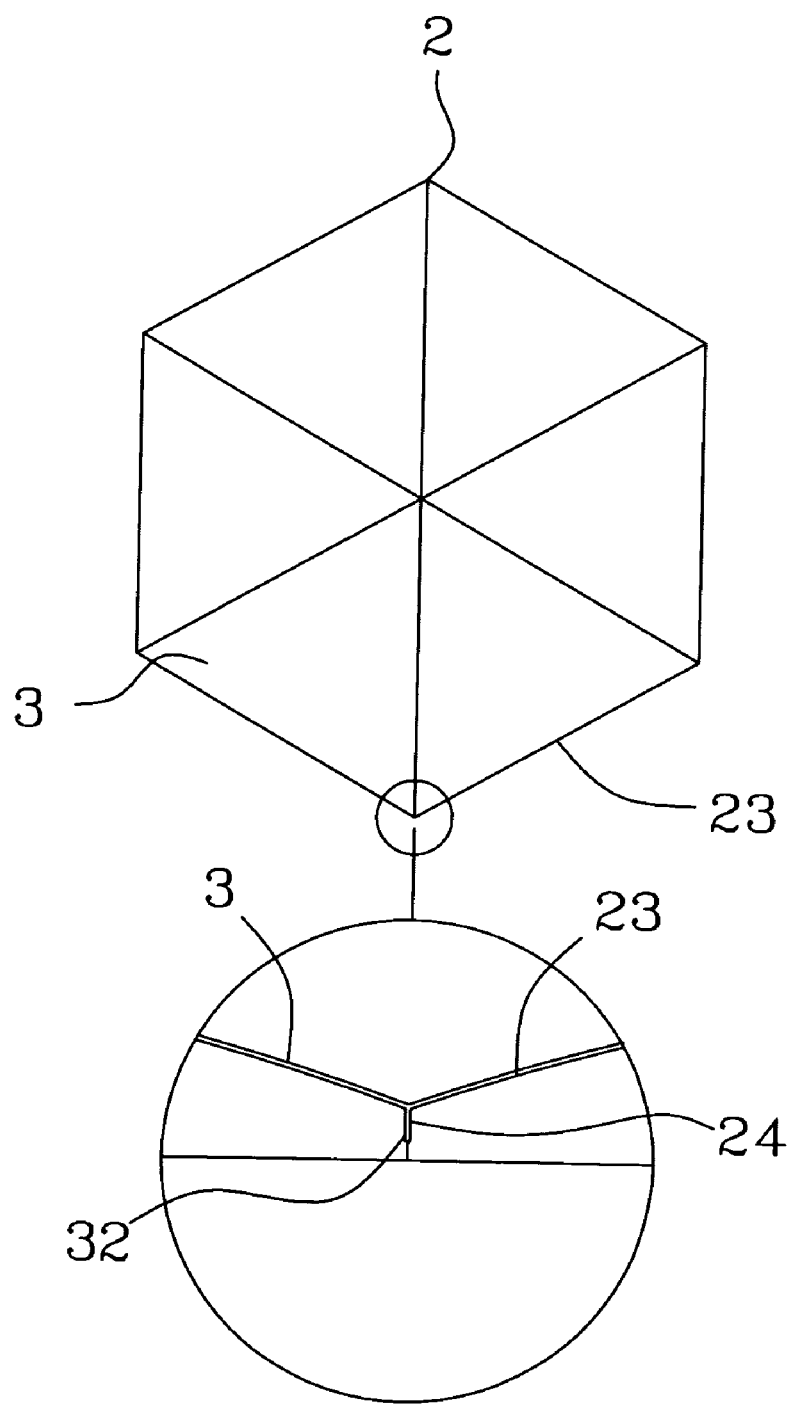
FIG. 7 corresponds to FIG. 5 but showing an alternate form of the light guide board.

Referring to FIG. 7, a downwardly extending narrow cut 24 is provided in between each two adjacent smoothly curved triangularly shaped panels 23, and the reflective layer 3 has a plurality of light blocking protruding portions 32 respectively engaged into the downwardly extending narrow cut 24 between each two adjacent smoothly curved triangularly shaped panels 23 to prevent dispersion of reflected light through the six peripheral sides.

Figure 8:
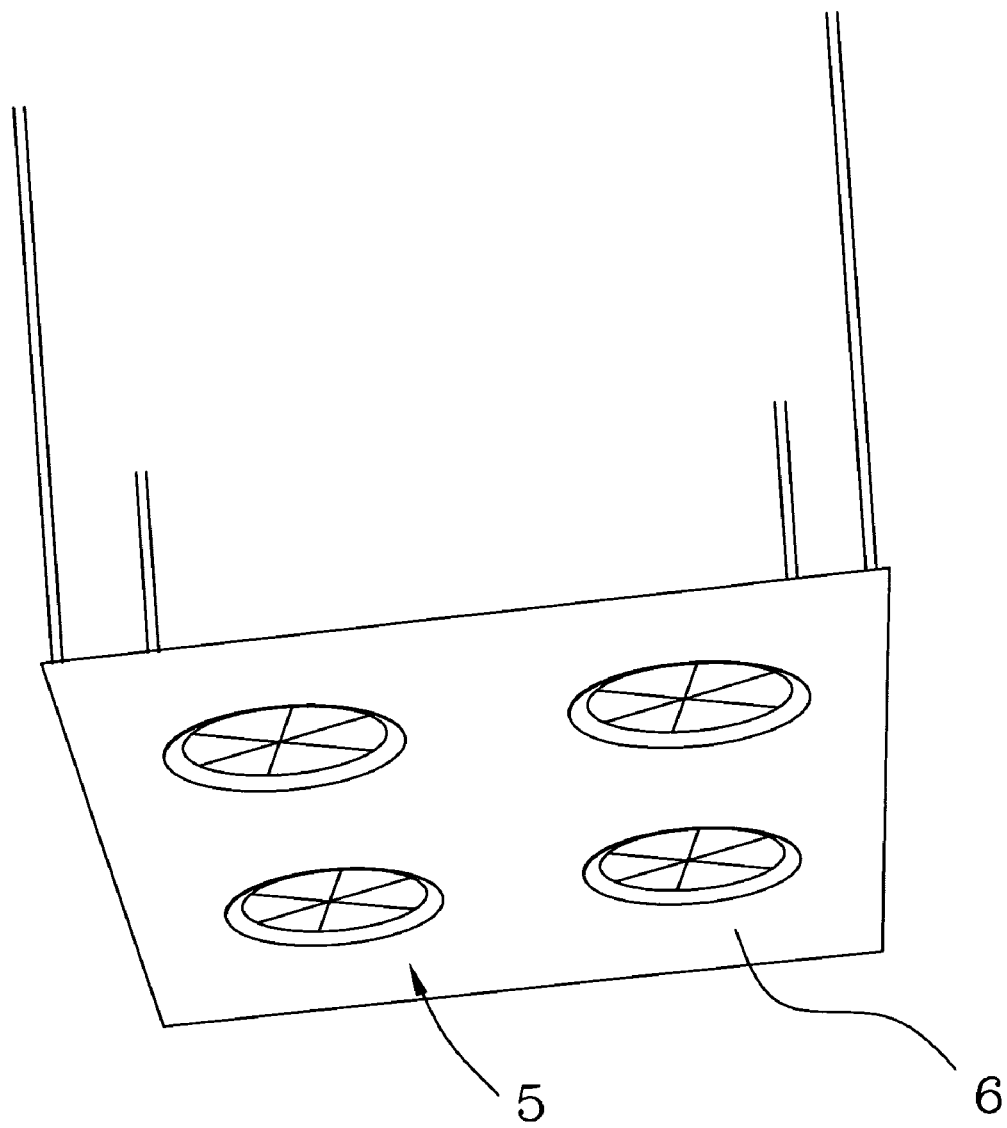
FIG. 8 is a schematic drawing showing an application example of the present invention.
Figure 9:
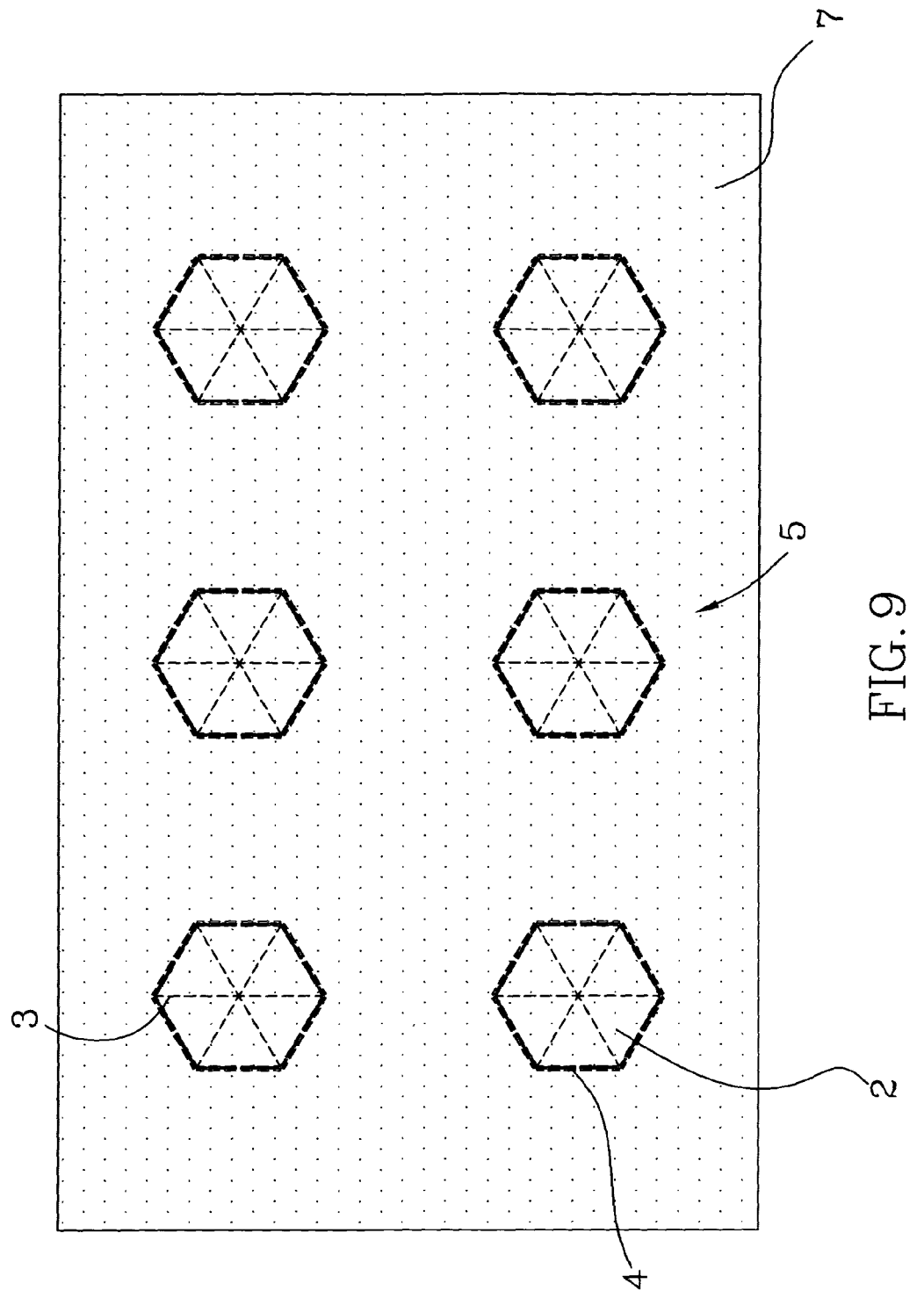
FIG. 9 is a schematic drawing showing another application example of the present invention.

Because the invention simulates the lighting effect of a ball lamp, it makes up for the shortcoming of the aforesaid two prior art designs, broadening the application range of the lighting fixture. In addition to the use as an embedded lamp, multiple lighting lamps 5 can be arranged in an array on a mounting board 6, forming a ceiling lamp assembly as shown in FIG. 8. FIG. 9 shows another application example of the present invention in which a frosted glass board 7 is provided in front of an array of lighting lamps 5 for use as a backlight module in a liquid crystal display screen.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A lighting lamp comprising:
a cavity;
a light guide board mounted inside said cavity, said light guide board being a polygonal board made of a high transmissive material, said light guide board comprising a clear transmission layer at a front side thereof and a reflective layer covered on a back side thereof, said reflective layer having the shape of an umbrella surface and sloping from the periphery toward the center thereof;
a plurality of LEDs mounted within said cavity outside said light guide board and adapted to emit light laterally into the inside of said light guide board to provide a uniform lighting effect having an enhanced brightness without causing multi-image and to simulate the lighting effect of a ball lamp.

2. The lighting lamp as claimed in claim 1, wherein said reflective layer fits over the polygonal shape of said light guide board; said light guide board is divided into multiple smoothly curved triangularly shaped panels, said smoothly curved triangularly shaped panels curving outwards and sloping downwardly toward the center of said reflective layer.

3. The lighting lamp as claimed in claim 2, wherein said reflective layer comprises a plurality of downwardly extending light blocking protruding portions respectively engaged into a respective downwardly extending narrow cut between each two adjacent smoothly curved triangularly shaped panels of said light guide board.

4. A lighting lamp comprising:
a lamp holder, said lamp holder defining therein a cavity;
a light guide board mounted inside said cavity, said light guide board being a polygonal board made of a high transmissive material, said light guide board comprising a clear transmission layer at a front side thereof and a reflective layer covered on a back side thereof, said reflective layer having the shape of an umbrella surface and sloping from the periphery toward the center thereof;
a plurality of LEDs mounted within said cavity outside said light guide board and adapted to emit light laterally into the inside of said light guide board to provide a uniform lighting effect having an enhanced brightness without causing multi-image and to simulate the lighting effect of a ball lamp.

5. The lighting lamp as claimed in claim 4, wherein said reflective layer fits over the polygonal shape of said light guide board;
said light guide board is divided into multiple smoothly curved triangularly shaped panels, said smoothly curved triangularly shaped panels curving outwards and sloping downwardly toward the center of said reflective layer.

6. The lighting lamp as claimed in claim 5, wherein said reflective layer comprises a plurality of downwardly extending light blocking protruding portions respectively engaged into a respective downwardly extending narrow cut between each two adjacent smoothly curved triangularly shaped panels of said light guide board.

7. The lighting lamp as claimed in claim 4, wherein multiple lighting lamps are arranged in an array in a mounting board for use as a ceiling lighting fixture.

8. The lighting lamp as claimed in claim 4, wherein a frosted glass is provided in front of an array of multiple lighting lamps.

9. A lighting lamp comprising:
a lamp holder, said lamp holder defining therein a cavity;
a light guide board mounted inside said cavity, said light guide board being a hexagonal board made of a high transmissive material, said light guide board comprising a clear transmission layer at a front side thereof and a reflective layer at a back side thereof, said clear transmission layer having a back surface shaped like an umbrella surface and sloping from the periphery toward the center thereof, said reflective layer being covered on said umbrella-like back surface of said clear transmission layer, said umbrella surface-like back surface being divided into 6 smoothly curved triangularly shaped panel, said smoothly curved triangularly shaped panels curving outwards and sloping downwardly toward the center of said reflective layer; and
a plurality of LEDs mounted within said cavity outside said light guide board and adapted to emit light laterally into the inside of said light guide board to provide a uniform lighting effect having an enhanced brightness without causing multi-image and to simulate the lighting effect of a ball lamp.

10. The lighting lamp as claimed in claim 9, wherein said reflective layer comprises a plurality of downwardly extending light blocking protruding portions respectively engaged into a respective downwardly extending narrow cut between each two adjacent smoothly curved triangularly shaped panels of said light guide board.

11. The lighting lamp as claimed in claim 9, wherein multiple lighting lamps are arranged in an array in a mounting board for use as a ceiling lighting fixture.

12. The lighting lamp as claimed in claim 9, wherein a frosted glass is provided in front of an array of multiple lighting lamps.

\* \* \* \* \*